(12) United States Patent
Shiee et al.

(10) Patent No.: US 10,753,787 B1
(45) Date of Patent: Aug. 25, 2020

(54) SENSOR DATA PROCESSING FOR DETECTION OF CHANGES IN ITEM QUANTITIES

(71) Applicant: AMAZON TECHNOLOGIES, INC., Seattle, WA (US)

(72) Inventors: Navid Shiee, Seattle, WA (US); Kun Qian, Seattle, WA (US); Gopi Prashanth Gopal, Redmond, WA (US); Ohil Krishnamurthy Manyam, Bellevue, WA (US); Connor Spencer Blue Worley, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/673,418

(22) Filed: Nov. 4, 2019

Related U.S. Application Data

(63) Continuation of application No. 14/576,263, filed on Dec. 19, 2014, now Pat. No. 10,466,092.

(51) Int. Cl.
| | | |
|---|---|---|
| *G01G 19/00* | (2006.01) | |
| *G01G 15/00* | (2006.01) | |
| *G06Q 10/08* | (2012.01) | |

(52) U.S. Cl.
CPC ............ *G01G 19/00* (2013.01); *G01G 15/00* (2013.01); *G06Q 10/087* (2013.01)

(58) Field of Classification Search
CPC ....... G01G 19/00; G01G 15/00; G06Q 10/087
See application file for complete search history.

(56) References Cited

U.S. PATENT DOCUMENTS

| | | |
|---|---|---|
| 4,396,079 A | 8/1983 | Brendel |
| 4,986,376 A | 1/1991 | Cone |
| 5,033,562 A | 7/1991 | Cone |
| 5,515,737 A | 5/1996 | Imai et al. |
| 5,561,274 A | 10/1996 | Brandorff |
| 5,623,128 A | 4/1997 | Grimm et al. |
| 7,225,980 B2 | 6/2007 | Ku et al. |
| 7,949,568 B2 | 5/2011 | Fano et al. |
| 8,009,864 B2 | 8/2011 | Linaker et al. |
| 8,113,431 B2 | 2/2012 | Gregerson |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 9,473,747 B2 | 10/2016 | Kobres et al. |

(Continued)

OTHER PUBLICATIONS

"Type PB Load Cell", Flintec, www.flintec.com, Retrieved from the Internet: URL: https://www.flintec.com/wp-content/uploads/2016/09/pb-planar-datasheet-en.pdf.

(Continued)

*Primary Examiner* — Manuel L Barbee
(74) *Attorney, Agent, or Firm* — Lindauer Law, PLLC

(57) ABSTRACT

Described are systems for processing sensor data associated with an inventory location for the purpose of identifying stable and unstable states in the sensor data. The stable and unstable states can be determined by fitting a line or curve to a portion of the sensor data occurring during a window of time and calculating a corresponding slope value of the line or curve. By comparing the slope value of the line or curve to a threshold value, stable and unstable states can be determined for the sensor data. Once stable states have been identified, a change in sensor data can be determined and used to identify a change in quantity of items at the inventory location.

20 Claims, 9 Drawing Sheets

(56) References Cited

U.S. PATENT DOCUMENTS

| | | |
|---|---|---|
| 10,121,121 B1 | 11/2018 | Bonet et al. |
| 2001/0007982 A1 | 7/2001 | Brown |
| 2006/0238346 A1 | 10/2006 | Teller |
| 2007/0142732 A1 | 6/2007 | Brockway et al. |
| 2011/0011936 A1 | 1/2011 | Morandi et al. |
| 2012/0284132 A1 | 11/2012 | Kim et al. |
| 2013/0284806 A1 | 10/2013 | Margalit |
| 2014/0201041 A1 | 7/2014 | Meyer |
| 2014/0297487 A1 | 10/2014 | Bashkin |
| 2015/0012396 A1 | 1/2015 | Puerini et al. |
| 2015/0075879 A1 | 3/2015 | Sakai et al. |
| 2015/0086107 A1 | 3/2015 | Dedeoglu et al. |
| 2017/0228686 A1 | 8/2017 | Rodriguez et al. |
| 2018/0164148 A1 | 6/2018 | Mueller |

OTHER PUBLICATIONS

Asthana, Abhaya, "An Indoor Wireless System for Personalized Shopping Assistance", CiteSeerX, In Proceedings of IEEE Workshop on Mobile Computing Systems and Applications, 1994, 6 pages. Retrieved from the Internet: http://citeseerx.ist.psu.edu/viewdoc/summary?doi=10.1.1.127.3303.

Barbee, Manuel L., "Final Office Action dated Dec. 29, 2017", U.S. Appl. No. 14/576,263, The United States Patent and Trademark Office, dated Dec. 29, 2017.

Barbee, Manuel L., "Non-Final Office Action dated Jun. 30, 2017", U.S. Appl. No. 14/576,263, The United States Patent and Trademark Office, dated Jun. 30, 2017.

Barbee, Manuel L., "Non-final Office Action dated Sep. 28, 2018", U.S. Appl. No. 14/576,263, The United States Patent and Trademark Office, dated Sep. 28, 2018.

Barbee, Manuel L., "Notice of Allowance dated Jun. 21, 2019", U.S. Appl. No. 14/576,263, The United States Patent and Trademark Office, dated Jun. 21, 2019.

Barbee, Manuel L., "Response to Amendment under Rule 312 dated Oct. 4, 2019", U.S. Appl. No. 14/576,263, The United States Patent and Trademark Office, dated Oct. 4, 2019.

Crandall, et al., "Signal Processing Techniques ", U.S. Appl. No. 15/199,030, The United States Patent and Trademark Office, Jun. 30, 2016.

Dimech, Andrew, "Weight Sensing Shelves", Video from YouTube, 3:20 duration, uploaded on Sep. 24, 2015. Retrieved from Internet: https://www.youtube.com/watch?v=71GboW_pWWc.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_super_markets.

Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

Vu, et al., "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

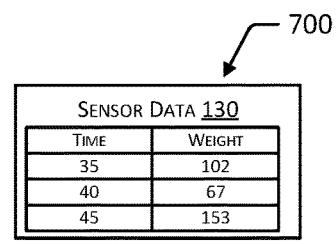

702 — ACCESS A FIRST SET OF SENSOR DATA

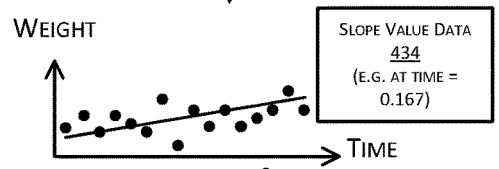

704 — DETERMINE SLOPE VALUE DATA OF A LINE FIT TO THE FIRST SET OF SENSOR DATA

706 — GENERATE ALARM DATA USING THE SLOPE VALUE DATA (E.G. CUSUM USING SLOPE VALUE)

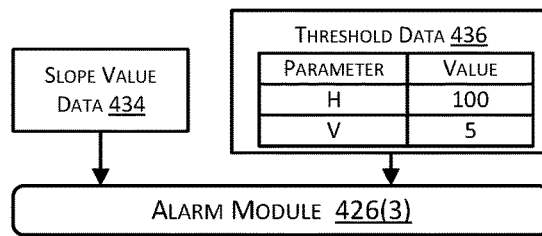

710 — GENERATE CHANGE DATA USING THE ALARM DATA

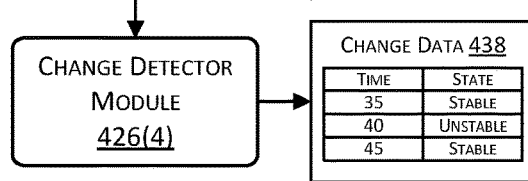
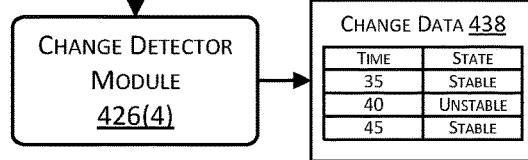

712 — DETERMINE A TRANSITION FROM A FIRST STABLE STATE AT A FIRST TIME TO AN UNSTABLE STATE AT A SECOND TIME TO A SECOND STABLE STATE AT A THIRD TIME

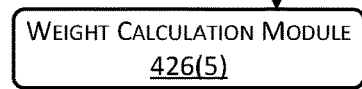

714 — GENERATE WEIGHT DATA USING THE SENSOR DATA ASSOCIATED WITH ONE OR MORE OF THE FIRST TIME OR THE THIRD TIME

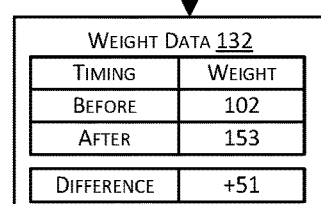

FIG. 7

SENSOR DATA PROCESSING FOR DETECTION OF CHANGES IN ITEM QUANTITIES

PRIORITY

This application is a continuation of, and claims priority to, U.S. patent application Ser. No. 14/576,263, filed on Dec. 19, 2014, entitled "Sensor Data Processing System," which issued as U.S. Pat. No. 10,466,092 on Nov. 5, 2019, and which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 depicts a process of generating weight data, according to some implementations.

Figure 1:
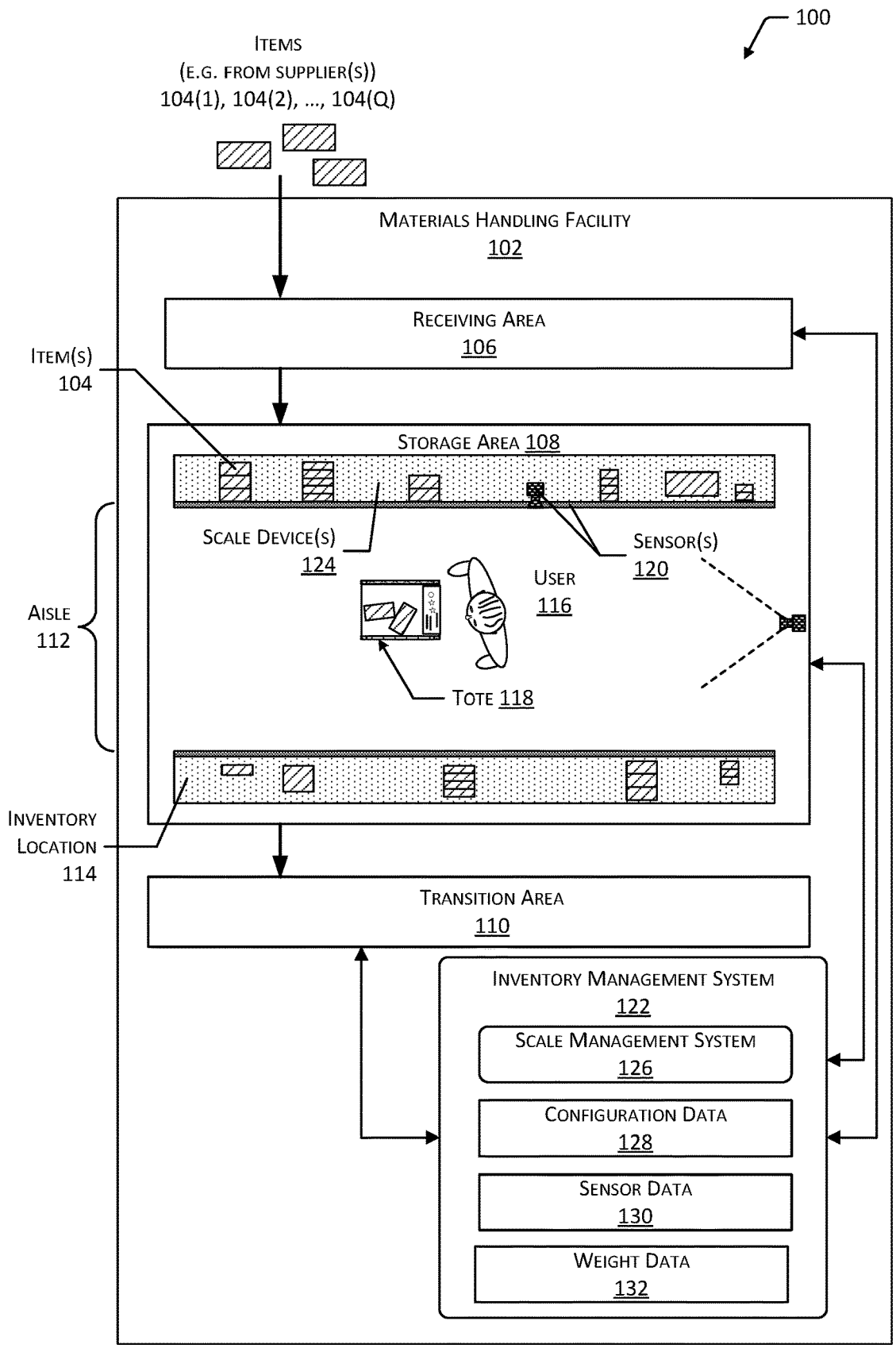
FIG. 1 is a block diagram illustrating a materials handling facility (facility) configured to use sensors, such as weight sensors.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing sensor data. The sensor data may be acquired at a materials handling facility (facility) or other setting. The facility may include, or have access to, an inventory management system. The inventory management system may be configured to maintain information about items, users, condition of the facility, and so forth using the sensor data. For example, the inventory management system may maintain information indicative of a quantity of items at particular inventory locations, what items a particular user is ordered to pick, location of the particular user, environmental status of the facility, and so forth.

The sensors may be located at different points within the facility, according to the type of sensor. For example, a weight sensor may be located at an inventory location to weigh items stowed in the inventory location. The sensor data may be processed to determine weight data. Based on the weight data, information indicative of a pick of items from the inventory location, placement of items to the inventory location, changes in item quantities at the inventory location, and so forth may be generated. The inventory management system may use the weight data to maintain information about inventory levels, track movement of items in the facility, and so forth.

Weight sensors may also be used in other parts of the facility, such as in a floor, in a parking area, and so forth. For example, weight sensors in the floor may generate sensor data that is processed to provide weight data indicative of how the weight of the user has changed responsive to the user picking or placing items. Continuing the example, the inventory management system may determine a quantity of items that have been picked by the user based on a decrease in weight associated with a weight sensor at an inventory location and on an increase in weight associated with a weight sensor in the floor upon which the user is standing.

The sensor data produced by the sensors may vary over time. This variance may result from one or more of settling time of the sensor, noise in the system, and so forth. For example, settling time is how much time the sensor takes to return to a stable value after being perturbed. In another example, noise may be how the sensor data produced by the sensor change varies from an actual quantity being measured.

The settling time may be dependent upon the mechanism of the sensor, the nature of the physical quantity being measured, and so forth. For example, a weight sensor may produce sensor data indicating a change in weight due to vibration, such as someone bumping into the structure holding the weight sensor, even when the weight on the sensor remains the same. Depending upon the physical characteristics of the item, addition or removal of items to the weight sensor may result in sensor data that varies over time. For example, an item that contains a liquid may experience transient changes as the liquid inside sloshes, until finally dampening down to a stable state. Other factors such as the presence of springs, elastic materials, or other mechanical components within a weight sensor or a supporting structure may introduce additional time-varying noise into the sensor data. Depending upon the load to the sensor, length of the settling time may vary. For example, a 100 g item on a weight sensor may have a different settling time than a 10 kg item on the same weight sensor. Other sensors may also experience settling times, such as an aneroid barometer that uses moving mechanical elements.

Noise in the sensor data may result from various factors such as operation of semiconductor devices, electromagnetic interference, thermal effects, signal processing artifacts, and so forth. Even with no physical changes to the sensor, noise may still be present in the sensor data. For example, the sensor data produced by a sensor that is in a stable (or settled) state may vary over time due to noise.

Traditional techniques for processing the sensor data introduce long latency times. During these long latency times, such as on the order of seconds to minutes, the sensor may be provided with time to settle, many samples of sensor data may be acquired and processed to try and compensate for noise, and so forth. However, these relatively long latency times limit the ability to use these sensors in rapidly changing environments. For example, in a fast-paced facility where items may be added or removed from an inventory location in rapid succession, adding a several second pause into the pick or place process may adversely affect throughput.

Described in this disclosure are techniques for processing sensor data acquired by sensors to provide accurate output with low-latency between acquisition of data and generation of output. These sensors may include but are not limited to weight sensors, light sensors, accelerometers, gyroscopes, magnetometers, temperature sensors, barometers, hygrometers, and so forth. The following illustrations are made with respect to weight sensors, however it is understood that these techniques may be used in conjunction with data acquired from the sensors described, or other sensors.

A weight sensor, or other sensor, provides sensor data. The sensor data may comprise a stream or time series of measurements or output from the sensor. In some implementations the sensor data may undergo preliminary filtering, downsampling, and so forth.

The sensor data may be processed to produce filtered sensor data. In one implementation, an exponential moving average (EMA) filter may be applied to the sensor data. Filtering may reduce some noise present in the sensor data, but may not remove the dependency of the noise on the quantity being measured, such as a weight on the weight sensor.

The filtered sensor data may be analyzed to determine changes indicative of a transition between stable and unstable states. The analysis may decouple the dependency between the noise and the quantity being measured, such as weight. A sample of the filtered sensor data occurring within a window length of an interval of time is determined. For example, the window length may be the most recent 500 milliseconds (ms) of filtered sensor data. For ease of illustration and not as a limitation, this may be visualized as a two-dimensional scatterplot with time increasing along an X axis and sensor data along a Y axis.

A line (or other curve) is fit to the filtered sensor data within the window length. For example, a linear regression technique such as a least squares method may be used to determine a straight line. Again, for ease of illustration, the straight line may be visualized as superimposed on the scatterplot. In other implementations, other curves may be fit using other functions.

A slope value indicative of a slope of the line may be determined. For example, the slope value may be indicative of a change in Y values relative to a change in X values, from one time to another. Continuing the example, the slope value may be described as "rise over run" of the line. A slope value of zero indicates a horizontal line, a positive slope value indicates a line corresponding to values increasing over time, and a negative slope value indicates a line corresponding to values decreasing over time. The slope value may be independent of the quantity being measured, such as the weight. For example, the slope value is not dependent upon whether an object being weighed is very light or very heavy.

The slope value is provided as input to a change detector. The change detector generates change data indicative of when the sensor data changes between stable and unstable states. The change data may be expressed in terms of time, sequence number indicative of a particular element of sensor data, or other suitable indicator of position within a series of sensor data. Use of the slope value helps in reducing the effect of spikes in the sensor data, such as physical jostling of the weight sensor.

The change detector may implement a cumulative sum (CUSUM) function to determine changes in the slope value indicative of a transition between stable and unstable states. By using the CUSUM function, or other similar functions, the effect of settling time is mitigated. The slope value may exhibit constant noise properties that are invariant to the quantity being measured (such as weight on the weight sensor) and may also exhibit no drift. Use of the CUSUM function with the slope value as input provides data indicative of a change that has occurred in the sensor data, independent of the weight on the weight sensor.

The change data indicative of when the sensor data is in a stable state may be associated with particular filtered sensor data. For example, the change data may indicate that the filtered sensor data was stable at t=313. The filtered sensor data corresponding to 313 ms may be retrieved, and used to provide weight data, such as indicating the weight on the weight sensor at t=313.

In some implementations, transitions between a stable state and an unstable state may be used to determine a net change in quantity, such as weight from a weight sensor. For example, the change data may indicate a first stable state at t=313, first unstable state at t=910, and a second stable state again at t=1105. The first stable state may be associated with first filtered sensor data indicative of a weight of 1.1 kg while the second stable state may be associated with second filtered sensor data indicative of a weight of 2.2 kg. By subtracting the first filtered sensor data from the second filtered sensor data, weight data indicative of a change of +1.1 kg to the weight at the weight sensor may be determined.

The weight data may be used by the inventory management system as described above. For example, previously stored inventory data may be used to determine that the per-item weight of a single item stowed at an inventory location may be 1.1 kg. Based on the change of +1.1 kg, the inventory management system may determine that a quantity of one item has been added to this inventory location.

By using the techniques described in this disclosure, sensor data may be processed to provide reliable, low-latency output. For example, sensor data from weight sensors may be used to quickly produce accurate weight data. The inventory management system may use this weight data to operate the facility, such as tracking items, users, vehicles, and so forth. As a result, overall operation of the facility and the user experience may be improved.

Illustrative System

An implementation of a materials handling system 100 configured to store and manage inventory items is illustrated in FIG. 1. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth. The totes 118 are discussed in more detail below with regard to FIG. 6.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, weight sensors, imaging sensors, proximity sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices, may contain sensors 120 configured to acquire sensor data. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The facility 102 may include one or more scale devices 124 configured to provide information about weight of a load placed upon a weight sensor. The scale devices 124 are described in more detail below with regard to FIG. 4.

The scale devices 124 may be in communication with a scale management system 126. The scale management system 126 may be configured to administer operation of the scale devices 124. For example, the scale management system 126 may be configured to provide configuration data 128 to one or more the scale devices 124. The configuration data 128 may be provided to one or more of the scale devices 124 to set various parameters, such as selecting filtering options, window length, and so forth. The configuration data 128 is discussed in more detail below with regard to FIG. 4.

The scale devices 124 may be configured to generate one or more of sensor data 130 or weight data 132. The sensor data 130 may comprise output from the scale device 124, such as a series of readings produced by one or more of the weight sensors in the scale device 124. In some implementations, the sensor data 130 may be partially processed, such as comprising a set of downsampled readings.

The scale devices 124 may perform onboard processing of the sensor data 130 and provide weight data 132 to the inventory management system 122. In other implementations, the scale devices 124 may provide the sensor data 130 to another device for processing and subsequent generation of weight data 132.

The weight data 132 may comprise information indicative of a weight at a particular time, variance or change in weight from one time to another, and so forth. For example, the weight data 132 may indicate that the weight on the weight sensor of the scale device 124 has increased by 1.1 kg from a first time to a second time.

The inventory management system 122 may use the weight data 132 to track one or more objects in the facility 102, to determine a quantity of items 104, and so forth. For example, the inventory location 114(1) may include a scale device 124(1) and the tote 118(1) may also include a scale device 124(2), producing weight data 132(1) and 132(2), respectively. Based at least in part on the weight data 132(1) decreasing by 1.1 kg and the weight data 132(2) increasing by 1.1 kg within a threshold time period (such as five seconds later), the inventory management system 122 may determine that an item 104 stored at the inventory location 114(1) has been transferred to the tote 118(1).

Figure 2:
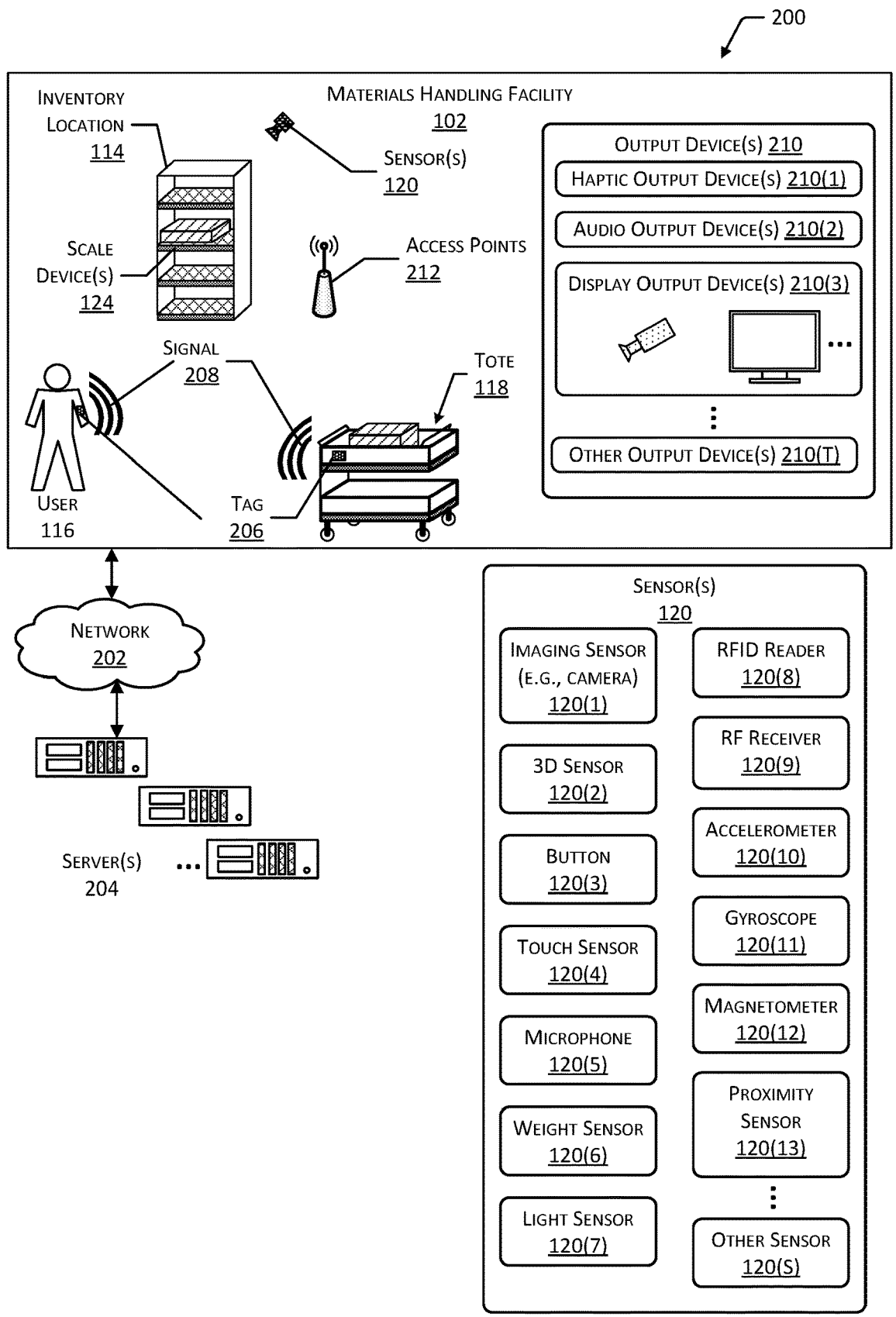
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 5.

The facility 102 may include one or more scale devices 124. The scale devices 124 may communicate with the servers 204 using the network 202.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and be used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) may be configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field of view. The 3D sensors 120(2) may include range cameras, lidar systems, sonar systems, radar systems, structured light systems, stereo vision systems, optical interferometry systems, coded aperture systems, and so forth.

The inventory management system 122 may use the three-dimensional data acquired to identify objects, determine one or more of a location, orientation, or position of an object. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account, configuration settings for a device such as a scale device 124, and so forth.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu, one or more particular items 104 for picking.

One or more microphones 120(5) may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity.

A scale device 124 may include one or more weight sensors 120(6) to produce sensor data 130 that may be processed to generate weight data 132. The inventory management system 122 may use the weight data 132 to identify an object, determine a location of an object, maintain shipping records, and so forth. For example, the scale device 124 at a particular location in the facility 102 may report a weight of the user 116, indicating the user 116 is present at that location.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 130 indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

The sensors 120 may include other sensors 120(S) as well. For example, the other sensors 120(S) may include ultrasonic rangefinders, thermometers, barometric sensors, hygrometers, vibration sensors, or biometric input devices. Continuing the example, the biometric input devices may include, but are not limited to, fingerprint readers, palm scanners, and so forth.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 122, the sensors 120, the scale devices 124, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
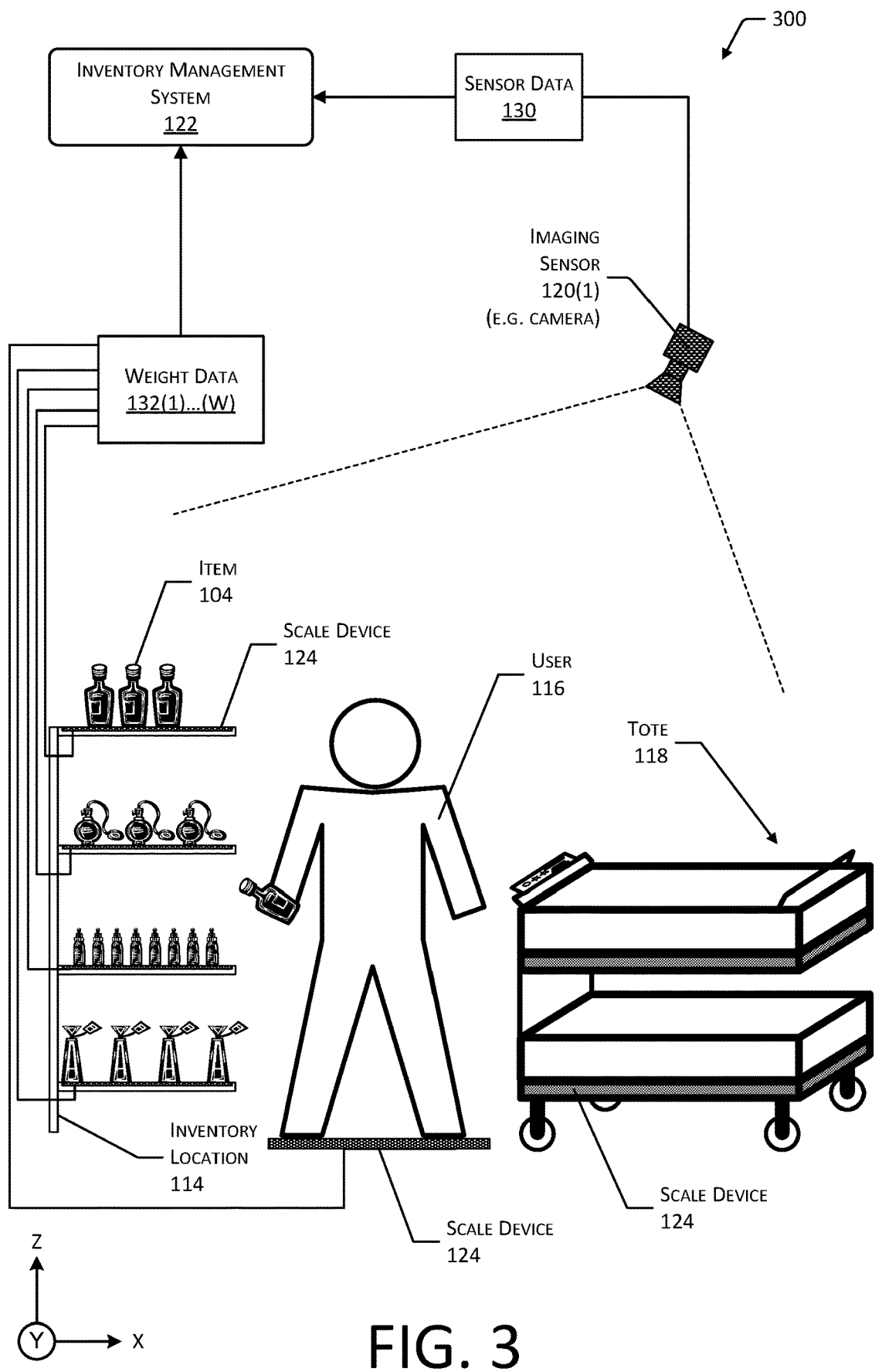
FIG. 3 illustrates a side view of a portion of the facility and various weight sensors, according to some implementations.

FIG. 3 illustrates a side view 300 of a portion of the facility 102. This illustration depicts inventory locations 114 comprising shelves mounted to a rack. Each of the inventory locations 114 may have one or more scale devices 124. As described above, the scale devices 124 are configured to generate one or more of sensor data 130 or weight data 132 indicative of a load placed upon the weight sensor 120(6). The scale devices 124 may also be deployed elsewhere within the facility 102, such as in the floor, on the tote 118, and so forth. The weight data 132 generated from the sensor data 130 may be used by the inventory management system 122 to determine a quantity of items 104 at an inventory location 114, whether the user 116 or another agency has picked or placed items 104 from the inventory location 114 or the tote 118, and so forth. For example, the user 116 may pick an item 104 from the inventory location 114. The weight of the user 116 has now changed to include the weight of the item 104. As the user 116 places the item 104 into the tote 118, the weight of the user 116 decreases and the weight measured by the scale device 124 onboard the tote 118 a similarly increased. Based at least in part on the weight data 132, the inventory management system 122 may determine that an item 104 has been removed by the user 116 and placed in the tote 118.

Other sensors 120 may also be deployed within the facility 102. For example, imaging sensors 120(1) may be deployed to acquire sensor data 130 such as images of the inventory locations 114, the users 116, and so forth. The inventory management system 122 may use one or more of the sensor data 130, weight data 132, and so forth to facilitate operation of the facility 102.

Figure 4:
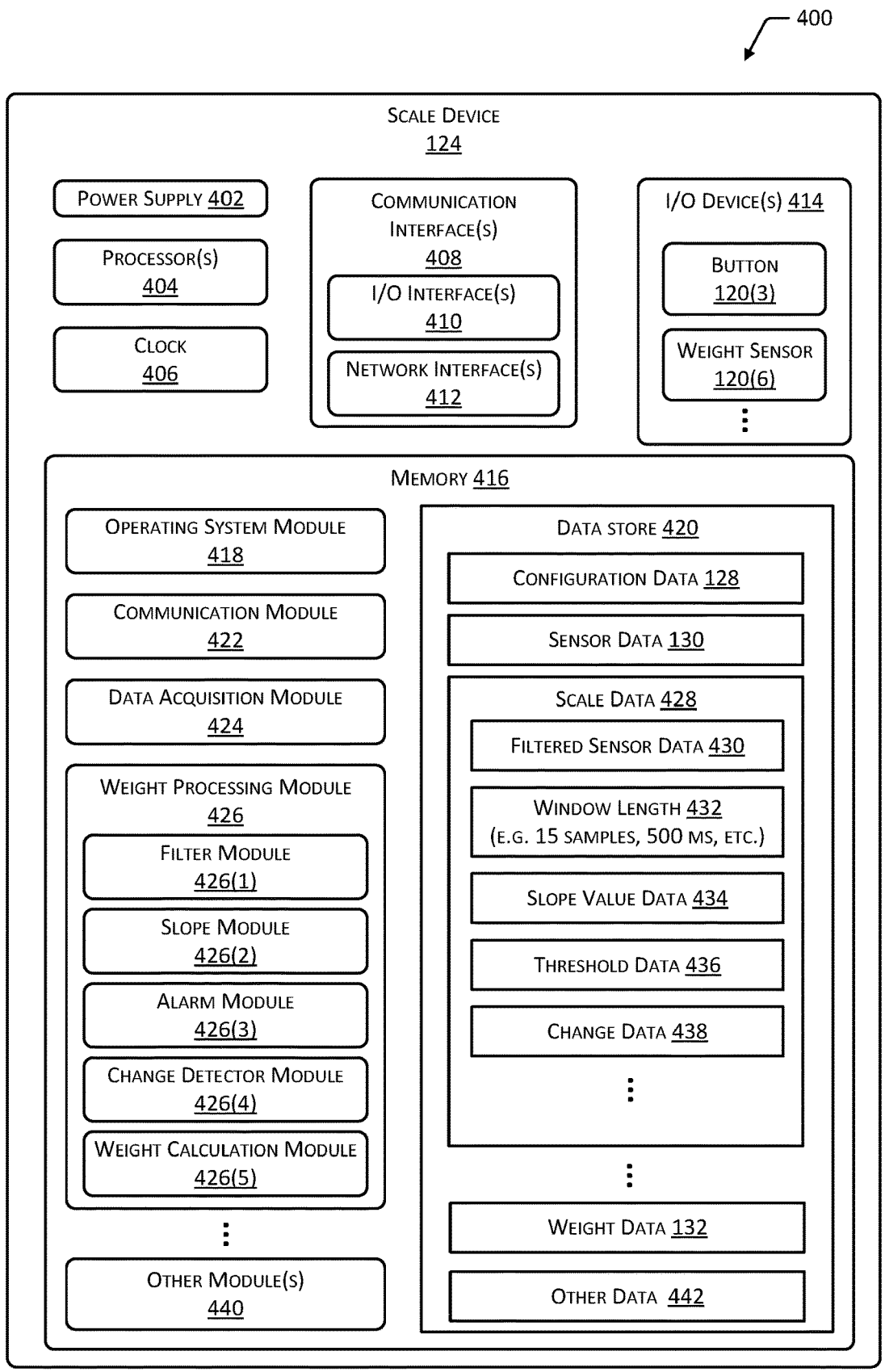
FIG. 4 illustrates a block diagram of a scale device including a weight sensor, according to some implementations.

FIG. 4 illustrates a block diagram 400 of a scale device 124, according to some implementations. One or more power supplies 402 are configured to provide electrical power suitable for operating the components in the scale device 124. In one implementation, the power supply 402 may be configured to acquire electrical energy from a communication interface, such as a wired Ethernet connection providing power over Ethernet.

The scale device 124 may include one or more hardware processors 404 (processors) configured to execute one or more stored instructions. The processors 404 may comprise one or more cores of different types. For example, the processors 404 may include application processor units, graphic processing units, and so forth. In one implementation, the processor 404 may comprise a microcontroller.

One or more clocks 406 may provide information indicative of date, time, ticks, and so forth. For example, the processor 404 may use data from the clock 406 to generate time values, trigger a preprogrammed action, and so forth.

The scale device 124 may include one or more communication interfaces 408, such as input/output (I/O) interfaces 410, network interfaces 412, and so forth. The communication interfaces 408 enable the scale device 124, or components thereof, to communicate with other devices or components. The communication interfaces 408 may include one or more I/O interfaces 410. The I/O interfaces 410 may comprise Inter-Integrated Circuit (I2C), Serial Peripheral Interface (SPI), Universal Serial Bus (USB) as promulgated by the USB Implementers Forum, RS-232, and so forth.

The I/O interface(s) 410 may couple to one or more I/O devices 414. In some implementations, the scale device 124 may be a "headless" device and omit onboard output devices 210. The I/O devices 414 may include one or more sensors 120, such as the button 120(3), weight sensor 120(6), and so forth. The I/O devices 414 may be at least partially physically incorporated within the scale device 124. For example, an enclosure such as a case may contain the weight sensor 120(6) and the processor 404.

The network interfaces 412 are configured to provide communications between the scale device 124 and other devices, routers, servers 204, access points 212, and so forth. The network interfaces 412 may include devices configured to couple to personal area networks (PANs), local area networks (LANs), wide area networks (WANs), and so forth. The network interfaces 412 may be wired or wireless. For example, the network interfaces 412 may include devices compatible with Ethernet, Wi-Fi, Bluetooth, ZigBee, and so forth.

The scale device 124 may also include one or more busses or other internal communications hardware or software that allow for the transfer of data between the various modules and components of the scale device 124.

As shown in FIG. 4, the scale device 124 includes one or more memories 416. The memory 416 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 416 provides storage of computer-readable instructions, data structures, program modules, and other data for the operation of the scale device 124. A few example functional modules are shown stored in the memory 416, although the same functionality may alternatively be implemented in hardware, firmware, application specific integrated circuits, field programmable gate arrays, or as a system on a chip (SoC).

The memory 416 may include at least one operating system (OS) module 418. The OS module 418 is configured to manage hardware resource devices such as the communication interfaces 408, the input devices 414, and so forth, and provide various services to applications or modules executing on the processors 404. The OS module 418 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Also stored in the memory 416 may be a data store 420 and one or more of the following modules. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other scale devices 124, network attached storage devices, and so forth.

A communication module 422 may be configured to establish communications with one or more of the other scale devices 124, servers 204, or other devices. The communications may be authenticated, encrypted, and so forth.

A data acquisition module 424 may be stored in the memory 416. The data acquisition module 424 may be configured to acquire sensor data 130 from one or more of the I/O devices 414 coupled to the scale device 124. For example, the data acquisition module 424 may receive raw data from the weight sensor 120(6). In some implementations, the data acquisition module 424 may provide some preliminary processing. For example, the data acquisition module 424 may downsample the raw data, may apply filters such as a Kalman filter to the raw data, and so forth. In some implementations, the data acquisition module 424 may affix time values (such as provided by the clock 406) or sequence numbers to the samples, frames, or other data elements obtained from the I/O devices 414. The data acquisition module 424 provides sensor data 130 to the other modules of the scale device 124.

In some implementations, the scale device 124 may not process the sensor data 130 onboard (locally) to generate weight data 132. In this implementation, the data acquisition module 424 may provide the sensor data 130 to the communication module 422. The communication module 422 may then provide at least a portion of the sensor data 130 to another device, such as the server 204.

The data store 420 may store the configuration data 128. The configuration data 128 may be received from another device, such as the scale management system 126. The configuration data 128 may specify parameters used during operation of the scale device 124. For example, the configuration data 128 may include information indicative of particular filter functions to be used to process the sensor data 130, network address of the server 204 to provide sensor data 130 or weight data 132 to, and so forth.

A weight processing module 426 may be stored in the memory 416. The weight processing module 426 may include one or more of a filter module 426(1), a slope module 426(2), an alarm module 426(3), a change detector module 426(4), a weight calculation module 426(5), or other modules. The weight processing module 426 may access or otherwise interact with scale data 428 that may also be stored in the data store 420.

The computer-executable instructions included in this disclosure are written in the Python programming language as promulgated by the Python Software Foundation (www.python.org). In other implementations, the computer-executable instructions may be expressed using other programming languages.

The filter module 426(1) is configured to apply or process at least a portion of the sensor data 130 using one or more filter functions to produce filtered sensor data 430. For example, the filter module 426(1) may be configured to implement an exponential moving average (EMA) filter. One implementation of the EMA filter that may be used to generate filtered sensor data 430 is described below with regard to Code Implementation 1.

CODE IMPLEMENTATION 1

```
class MovingAverage:
    def _init_(self, samplesiw, baseema=None):
        self.current_estimate = baseema
        self.decay = 2.0/(samplesiw + 1)
        self.numsamples = 0
        self.samplesiw = samplesiw
    def add_sample(self, sample):
        self.numsamples += 1
        if self.current_estimate is None:
            self.current_estimate = sample
        else:
            self.current_estimate = self.decay*sample + (1 -
self.decay)*self.current_estimate
    def get_estimate(self):
        return self.current_estimate
```

The slope module 426(2) is configured to process a portion of the filtered sensor data 430 corresponding to a window length 432 to generate slope value data 434. The window length 432 may specify a number of samples or elements of the filtered sensor data 430, a duration of time, and so forth. For example, the window length 432 may specify an interval of 500 ms. The portions of the filtered sensor data 430 that occur within the window length 432 are processed by the slope module 426(2).

The slope module 426(2) is configured to fit a curve to the filtered sensor data 430 within the window length 432. In one implementation, the line may be a straight line and the function used by the slope module 426(2) may perform a linear regression. For example, the linear regression may use a least squares error function to fit a straight line to the filtered sensor data 430. One implementation of the slope determination that may be used to determine the slope value data 434 is described below with regard to Code Implementation 2.

CODE IMPLEMENTATION 2

```
from collections import deque
import math
import numpy
# numpy is package available at www.numpy.org
from collections import namedtuple
# this tuple holds slope value and a scale readout
SlopeAndEstimate = namedtuple("SlopeAndEstimate",
['slope', 'estimate', 'norm_error'])
class LineFitEstimator:
    """ This class accumulates floating point samples in a
window and provides the ability to obtain the slope and
```

CODE IMPLEMENTATION 2

```
estimate for the samples in the window, as obtained after
fitting a line using least square error function.
    """
    def __init__(self, samplesiw, base_value=None):
        self._windowsize = samplesiw
        self._window = deque(maxlen=samplesiw)
        self._xdata = numpy.array(range(0, samplesiw))
        # initialize the window with the base value
        if base_value is not None:
            for i in xrange(self._windowsize):
                self._window.append(base_value)
            self._samples_since_last_estimate = samplesiw # counting base value
        self._last_estimate = None
        # The approach is based on solving a normal equation:
        C = pinv(X'*X)*X'*y
        # where C is the coefficient vector.
        # Since X doesn't change (see xdata above), can cache the entire
        # first part of the equation. To get an estimate, may multiply cache with the window data(y)
        normal_eq_x = numpy.column_stack([numpy.ones(self._windowsize), self._xdata])
        inv = numpy.linalg.pinv(normal_eq_x.T.dot(normal_eq_x))
        self._normal_eq_cache = inv.dot(normal_eq_x.T)
    def get_slope_and_estimate(self, estimate_weight=.5, cache_samples=0, compute_error=True):
        """
        estimate_weight tells if algorithm should weigh
towards older(0) or newer(1) samples when providing an
estimated value
        """
        if self._last_estimate is None or self._samples_since_last_estimate > cache_samples:
            self._samples_since_last_estimate = 0
            slope, const, norm_error = self._line_fit_normal_eq(compute_error)
            estimate = slope*self._windowsize*estimate_weight + const
            self._last_estimate = SlopeAndEstimate(slope, estimate, norm_error)
        return self._last_estimate
    def _line_fit_normal_eq(self, compute_error):
        const, slope = self._normal_eq_cache.dot(self._window)
        # compute the residual if asked
        residual = None
        if compute_error:
            # the cost per call doubles when residual has to be computed.
            # estimated values for window
            values = slope*self._xdata + const
    def _line_fit_normal_eq(self, compute_error):
        const, slope = self._normal_eq_cache.dot(self._window)
        # compute the residual if asked
        residual = None
        if compute_error:
            #the cost per call doubles when residual has to be computed.
            # estimated values for window
            values = slope*self._xdata + const
            # compute the error per sample:
            self.error = values - self._window
            # the residual may be a dot product
            residual = self.error.dot(self.error)
    return slope, const, math.sqrt(residual/self._windowsize)
    def get_estimate(self):
        return self.get_slope_and_estimate(estimate_weight=0.9, cache_samples=0).estimate
    def add_sample(self, sample):
        if len(self._window) == 0:
            for i in xrange(self._windowsize):
                self._window.append(sample)
        self._window.append(sample)
        self._samples_since_last_estimate += 1
```

The alarm module 426(3) accepts as input the slope value data 434 and threshold data 436, and determines when the slope value data 434 exceeds a threshold. The threshold data 436 may comprise one or more parameters, thresholds, or other data used to determine when the slope value data 434 is indicative of a stable or an unstable state. For example, the threshold data 436 may comprise the H and V values described below with regard to the CUSUM function.

The alarm module 426(3) may be configured to determine alarms indicative of a change of state beyond the threshold or boundary level. The alarm module 426(3) may implement one of the variations of the cumulative sum (CUSUM) function. The CUSUM function is a sequential analysis technique originally developed by E.S. Page. The CUSUM function may be configured to analyze changes to a plurality of slope values over time. One implementation of the alarm function using a variant of the CUSUM function is described below with regard to Code Implementation 3.

CODE IMPLEMENTATION 3

```
""""Runs cusum on a scalar value and alarms if there are changes."""
from abc_alarm_algorithm import AlarmAlgorithm
from abc_alarm_algorithm import AlarmEventType
import abc_metrics
class ScalarCusumAlgorithm(AlarmAlgorithm):
    """"An implementation of cumulative sum alarming.
    Takes in a signal estimate and raw signal and maintains
positive and negative residuals. Alarms if the residuals cross
a threshold.
    NOTE: Does not maintain the signal estimate.
    A note about the H and V design parameters:
    H:
    If the cumulative sum of the positive or negative residual
(delta of the raw signal and signal estimate) exceeds this
value, an alarm is raised and the cumulative sums are reset.
This is related to the noise of the system and what the
operator wants to be defined as a change.
    A good value to start with is 100. If too many changes are
detected or the system is constantly unstable, try doubling
until a reasonable output is obtained.
    To get more changes, lower this value. To get fewer
changes, raise this value.
    V:
    At each new residual, this value is subtracted from the
positive and negative residual. This value is used to account
for drift in the system that could cause false cusum alarms. A
good value to start with is 5. If constantly unstable or
seeing slow events cause changes try raising this value. If
not seeing any changes try lowering this value.
    """"
    def __init__(self,
                 H,
                 V,
                 name="ScalarCusumAlgorithm",
                 unpack_method=None,
                 pack_method=None):
        """"Initializes the algorithm.
        keyword parameters:
        H - The H design parameter as a float.
        V - The V design parameter as a float.
        name - The name to initialize the alarm algorithm with
as a string. (Default ScalarCusumAlgorithm). Can be used as a
tag.
```

CODE IMPLEMENTATION 3

```
    unpack_method - Optional method used to reformat
inbound data, called before anything else in on_next( ).
(Default None)
    pack_method - Optional method used to reformat
outbound data, called before publishing in on_next( ). (Default
None)
    """
    super(ScalarCusumAlgorithm, self)._init_(name,
        unpack_method, pack_method)
    self._h_param = H
    self._v_param = V
    #check for a stable signal and force sums to 0
    residuals_crossed_zero = self._cusum_pos < 0. and
self._cusum_neg < 0.
    if self._cusum_pos < 0.:
        self._cusum_pos = 0.
    if self._cusum_neg < 0.:
        self._cusum_neg = 0.
    #notify stable if crossed 0
    if residuals_crossed_zero:
        return AlarmEventType.Signal_Estimate_Stable
    #alarm and reset if over threshold
    elif self._cusum_pos > self._h_param or \
        self._cusum_neg > self._h_param:
        self.last_cusum_pos_spike = self._cusum_pos
        self.last_cusum_neg_spike = self._cusum_neg
        self._cusum_pos = 0.
        self._cusum_neg = 0.
        return AlarmEventType.Alarm_Occurred
    #otherwise nothing happened
    else:
        return AlarmEventType.No_Event
def reset_h(self, new_h):
    """"Resets the H design parameter to the value passed
in.
    keyword parameters:
    new_h - The new h design parameter to use.
    """
    self._h_param = new_h
def reset_v(self, new_v):
    """"Resets the V design parameter to the value passed
in.
    keyword parameters:
    new_v - The new v design parameter to use.
    """
    self._v_param = new_v
def reset_cusum(self):
    """"Resets both cusum values to 0."""
    self._cusum_pos = 0
    self._cusum_neg = 0
```

The alarm function provides alarm data indicative of a change between states such as a stable state or an unstable state. The alarm data may then be processed by the change detector module 426(4) to generate change data 438. The change data 438 may comprise information indicative of a stable state, or an unstable state, for the filtered sensor data 430 within the window lengths 432 for which the slope value data 434 was determined. In some implementations, the change data 438 may be indicative of a transition from one state to another. For example, the change data 438 may indicate a transition from a stable state to an unstable state or from an unstable state to a stable state. One implementation of the change detector function as implemented by the change detector module 426(4) to generate change data 438 is described below with regard to Code Implementation 4.

CODE IMPLEMENTATION 4

```
"""The change detector parses a list of alarms and emits
state."""
from abc_change_detector import ChangeDetector
from abc_change_detector import ChangeEventType
from abc_alarm_algorithm import AlarmEventType
class BasicChangeDetector(ChangeDetector):
    """This change detector may be subscribed to an alarm
algorithm such as in Code Implementation 3.
    A note about stable frame threshold:
    Stable frame threshold dictates how many frames or samples
of sensor data to wait after alarming without a new alarm
occurring to consider the system is stable. Increase this
value if seeing changes broken up into small pieces. Lower
this to improve (reduce) latency.
    A good number to start with is 1. Increase if seeing
failures.
    """
    def _init_ (self, frames_to_wait_for_stable,
name="BasicChangeDetector",
        unpack_method=None, pack_method=None,
timeout=None):
        """Initializes the change detector. This change
detector links to an alarm algorithm and publishes state.
        keyword params:
        frames_to_wait_for_stable - How long to go without
alarming to consider the change over and system stable.
        name - The change detector label as a string (Default
BasicChangeDetector)
        unpack_method - Optional method used to reformat
inbound data, called before anything else in on_next( ).
(Default None)
        pack_method - Optional method used to reformat
outbound data, called before publishing in on_next( ). (Default
None)
        timeout - Time in seconds as a float to force a change
to end at. (Default None)
        """
        super(BasicChangeDetector, self)._init_ (name,
unpack_method,
            pack_method)
        self._stable_frame_threshold =
frames_to_wait_for_stable
        self._stable_frame_count = 0
        self._change_start_time = 0
        self._timeout = timeout
        self._state = "stable"
    def on_next(self, event):
        """Catches a stream of alarm events and publishes
change times.
        keyword params:
        event - An AlarmEvent indicating whether or not an
alarm occurred.
        returns a ChangeEvent that is equivalent to what would
be published.
        INPUT: A series of alarm events from an alarm
algorithm.
        OUTPUT: A series of change events dictating the change
event type.
        """
        #unpack
        if self.unpack_method is not None:
            event = self.unpack_method(event)
        ret = None
        signal_estimate = event.signal_estimate
        if event.event_type ==
AlarmEventType.Signal_Estimate_Stable:
            #if unstable there are several cases to handle
            if self._state is "unstable":
                self._stable_frame_count += 1
                #first check to see if done changing
                if self._stable_frame_count >=
self._stable_frame_threshold:
                    self._state = "stable"
                    ret = ChangeEventType.Change_Ended
                elif self._timeout is not None and
event.time_s - \
                    self._change_start_time >
self._timeout:
                    self._state = "stable"
```

CODE IMPLEMENTATION 4

```
            ret = ChangeEventType.Change_Ended
        #next check to see if stabilizing
        elif self._stable_frame_count == 1:
            ret = ChangeEventType.Stabilizing_Started
        #otherwise just publish to capture frame
        else:
            ret = ChangeEventType.Capture_Signal_Flag
    #if stable, publish to capture frame
    else:
        ret = ChangeEventType.Capture_Signal_Flag
elif event.event_type ==
AlarmEventType.Alarm_Occurred:
    if self._state is "stable":
        self._change_start_time = event.time_s
        ret = ChangeEventType.Change_Started
    else:
        ret =
ChangeEventType.Alarm_Occurred_While_Changing
    self._state = "unstable"
    self._stable_frame_count = 0
elif event.event_type == AlarmEventType.No_Event:
    if self._state is "unstable":
        self._stable_frame_count += 1
        #first check to see if done changing
        if self._stable_frame_count >=
self._stable_frame_threshold:
            self._state = "stable"
            ret = ChangeEventType.Change_Ended
        elif self._timeout is not None and
event.time_s - \
            self._change_start_time >
self._timeout:
            self._state = "stable"
            ret = ChangeEventType.Change_Ended
        #next check to see if stabilizing
        elif self._stable_frame_count == 1:
            ret = ChangeEventType.Stabilizing_Started
if ret is not None:
    change = self.construct_change_event(
        self._change_start_time, event.time_s, ret,
        signal_estimate, {})
    #pack
    if self.pack_method is not None:
        change = self.pack_method(change)
    self.publish_next (change)
    return change
```

The weight calculation module 426(5) is configured to generate weight data 132. The weight calculation module 426(5) determines filtered sensor data 430 associated with change data 438. For example, the change data 438 may indicate that the filtered sensor data 430 at t=721 is in a stable state. The filtered sensor data 430 associated with t=721 may be retrieved, and provided as the weight data 132.

In some implementations, the weight calculation module 426(5) may generate a weight differential indicative of a change from the first weight to a second weight. For example, the change data 438 may indicate that the filtered sensor data 430 was stable at a first time of t=721, unstable at t=775, and stable again at a second time of t=1100. The weight calculation module 426(5) may access as first weight data 132(1) the filtered sensor data 430(1) associated with the first time and access as second weight data 132(2) the filtered sensor data 430(2) associated with the second time. The weight calculation module 426(5) may subtract the first weight data 132(1) from the second weight data 132(2) to produce a weight differential. The weight differential thus provides information indicative of how the weight has changed from a first time to a second time.

Other modules 440 may also be present in the memory 416, as well as other data 442 in the data store 420. For example, the other modules 440 may include a power management module. The power management module may be configured to transition the scale device 124 from a low power mode to a higher power operating mode. For example, a change in the sensor data 130 exceeding a threshold level may be used to trigger the power management module to transition the scale device 124 from a low power mode to a higher power operating mode. The other data 442 may comprise information such as timing thresholds for use by the power management module.

Figure 5:
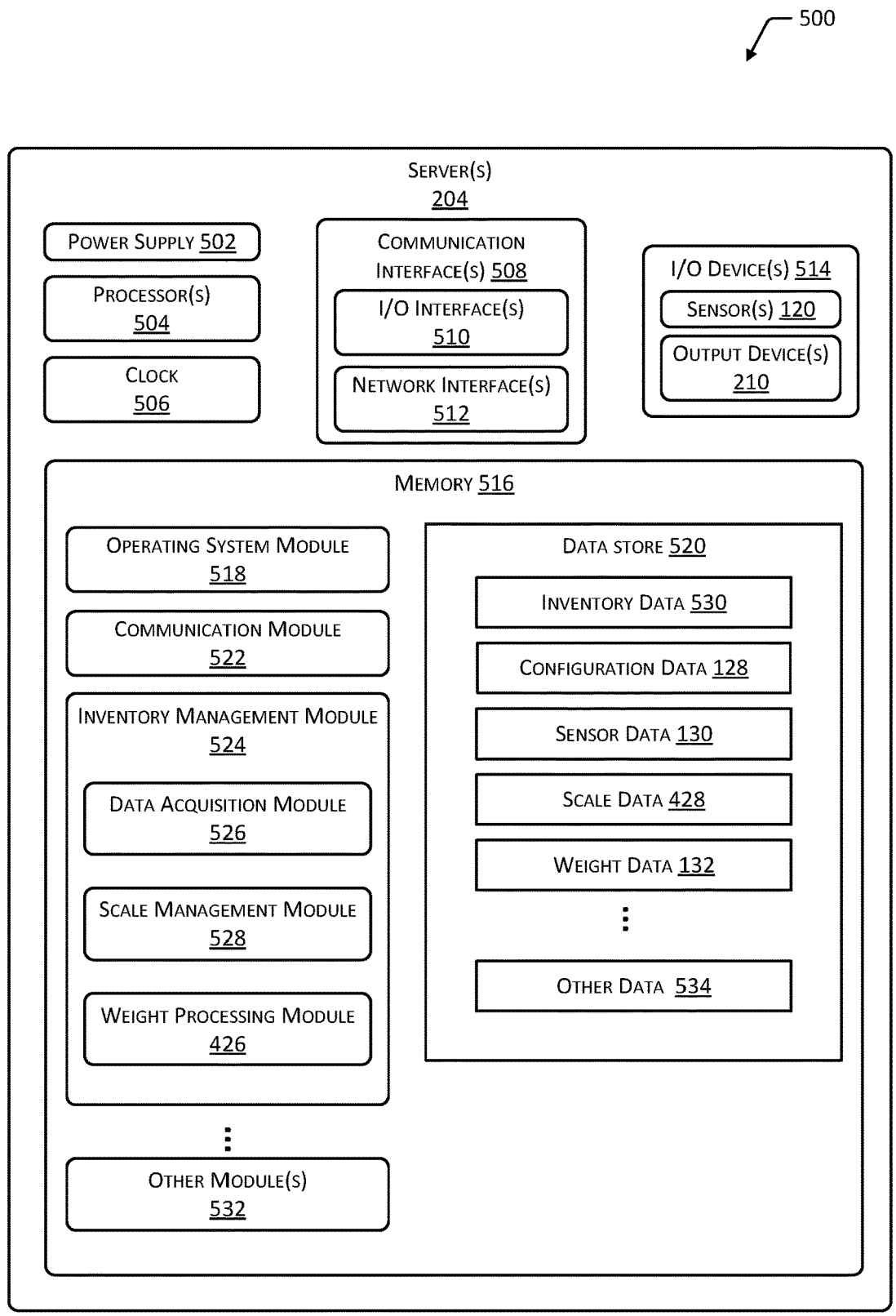
FIG. 5 illustrates a block diagram of a server configured to support operation of the facility, according to some implementations.

FIG. 5 illustrates a block diagram 500 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 502 are configured to provide electrical power suitable for operating the components in the server 204. The server 204 may include one or more hardware processors 504 (processors) configured to execute one or more stored instructions. The processors 504 may comprise one or more cores. The cores may be of one or more types. For example, the processors 504 may include application processor units, graphic processing units, and so forth. One or more clocks 506 may provide information indicative of date, time, ticks, and so forth. For example, the processor 504 may use data from the clock 506 to generate time values, trigger a preprogrammed action, and so forth.

The server 204 may include one or more communication interfaces 508, such as I/O interfaces 510, network interfaces 512, and so forth. The communication interfaces 508 enable the server 204, or components thereof, to communicate with other devices or components. The communication interfaces 508 may include one or more I/O interfaces 510. The I/O interfaces 510 may comprise 12C, SPI, USB, RS-232, and so forth.

The I/O interface(s) 510 may couple to one or more I/O devices 514. The I/O devices 514 may include input devices such as one or more of a sensor 120, keyboard, mouse, scanner, and so forth. The I/O devices 514 may also include output devices 210 such as one or more of a display device 210(3), printer, audio speakers, and so forth. In some embodiments, the I/O devices 514 may be physically incorporated with the server 204 or may be externally placed.

The network interfaces 512 are configured to provide communications between the server 204 and other devices, such as the scale devices 124, totes 118, routers, access points 212, and so forth. The network interfaces 512 may include devices configured to couple to personal area networks (PANs), local area networks (LANs), wide area networks (WANs), and so forth. For example, the network interfaces 512 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 5, the server 204 includes one or more memories 516. The memory 516 comprises one or more non-transitory CRSM as described above. The memory 516 may provide storage of computer-readable instructions, data structures, program modules, and other data for the operation of the server 204. A few example functional modules are shown stored in the memory 516, although the same functionality may alternatively be implemented in hardware, firmware, or as a system on a chip (SoC).

The memory 516 may include at least one OS module 518. The OS module 518 is configured to manage hardware resource devices such as the I/O interfaces 510, the I/O devices 514, the communication interfaces 508, and provide various services to applications or modules executing on the processors 504. The OS module 518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 516 may be a data store 520 and one or more of the following modules. These modules may be executed as foreground applications, background tasks, daemons, and so forth.

The data store 520 may use a flat file, database, linked list, tree, executable code, script, or other data structure to store information. In some implementations, the data store 520 or a portion of the data store 520 may be distributed across one or more other devices including the servers 204, network attached storage devices, and so forth.

A communication module 522 may be configured to establish communications with one or more of the totes 118, the sensors 120, the scale devices 124, other servers 204, or other devices. The communications may be authenticated, encrypted, and so forth.

The memory 516 may store an inventory management module 524. The inventory management module 524 may be configured to provide the inventory functions as described herein with regard to the inventory management system 122. For example, the inventory management module 524 may track items 104 between different inventory locations 114, to and from the totes 118, and so forth.

The inventory management module 524 may include one or more of a data acquisition module 526, a scale management module 528, the weight processing module 426, or other modules. The data acquisition module 526 may be configured to acquire and access information associated with operation of the facility 102. For example, the data acquisition module 526 may acquire information from the sensors 120, the scale devices 124, and so forth.

The inventory management module 524 may be configured to track or determine other information about objects in the facility 102 using inventory data 530, the sensor data 130, the weight data 132 received from the scale devices 124, and so forth, which may be stored in the data store 520.

The inventory data 530 comprises information about the items 104 within the facility 102. For example, the inventory data 530 may include information such as a weight of an individual item 104, or a package or grouping of items 104. The inventory data 530 may also include an association between one or more of scale devices 124, inventory locations 114, or items 104. For example, the inventory data 530 may indicate that the item 104(37) is designated for stowage at inventory location 114(79), and that each item 104(37) weighs 750 grams.

The scale management module 528 may be configured to generate, provide, or otherwise utilize the configuration data 128 to configure one or more of the scale devices 124. For example, the scale management module 528 may utilize one or more machine learning techniques or statistical techniques to analyze the sensor data 130 and corresponding weight data 132 provided by one or more scale devices 124 to generate configuration data 128. Continuing the example, the scale management module 528 may determine revised values of H or V as used by the CUSUM function of the alarm module 426(3).

The server 204 may include in the memory 516 the weight processing modules 426 described above with regard to FIG. 4. The data store 520 may also store scale data 428 associated with operation of the weight processing module 426 on the server 204.

In one implementation, the scale device 124 may provide the sensor data 130 and the weight data 132. In this implementation, the server 204 may process the sensor data 130 and compare it with the received weight data 132. For example, the server 204 may be configured to use threshold data 436, function within the alarm module 426(3), parameters in the change detector module 426(4), and so forth as compared to the scale device 124. The weight data 132(1) generated by the scale device 124 may be compared with weight data 132(2) generated by the server 204. Based on the comparison, the scale management module 528 may generate configuration data 128 to modify operation of the scale device 124.

In another implementation, the scale device 124 may not process the sensor data 130. For example, the scale device 124 may have insufficient resources to perform one or more of the functions of the weight processing module 426. In this implementation, the scale device 124 may provide the sensor data 130 to the server 204. The weight processing module 426 of the server 204 may then generate the weight data 132.

Other modules 532 may also be present in the memory 516, as well as other data 534 in the data store 520. For example, the other modules 532 may include an image processing module. The image processing module may be configured to use sensor data 130 such as image data acquired from one or more of the imaging sensors 120(1) to generate information about the facility 102. For example, the image processing module may be used to track objects within the facility 102. The other data 534 may comprise information such as object recognition characteristics for use by the image processing module.

Figure 6:
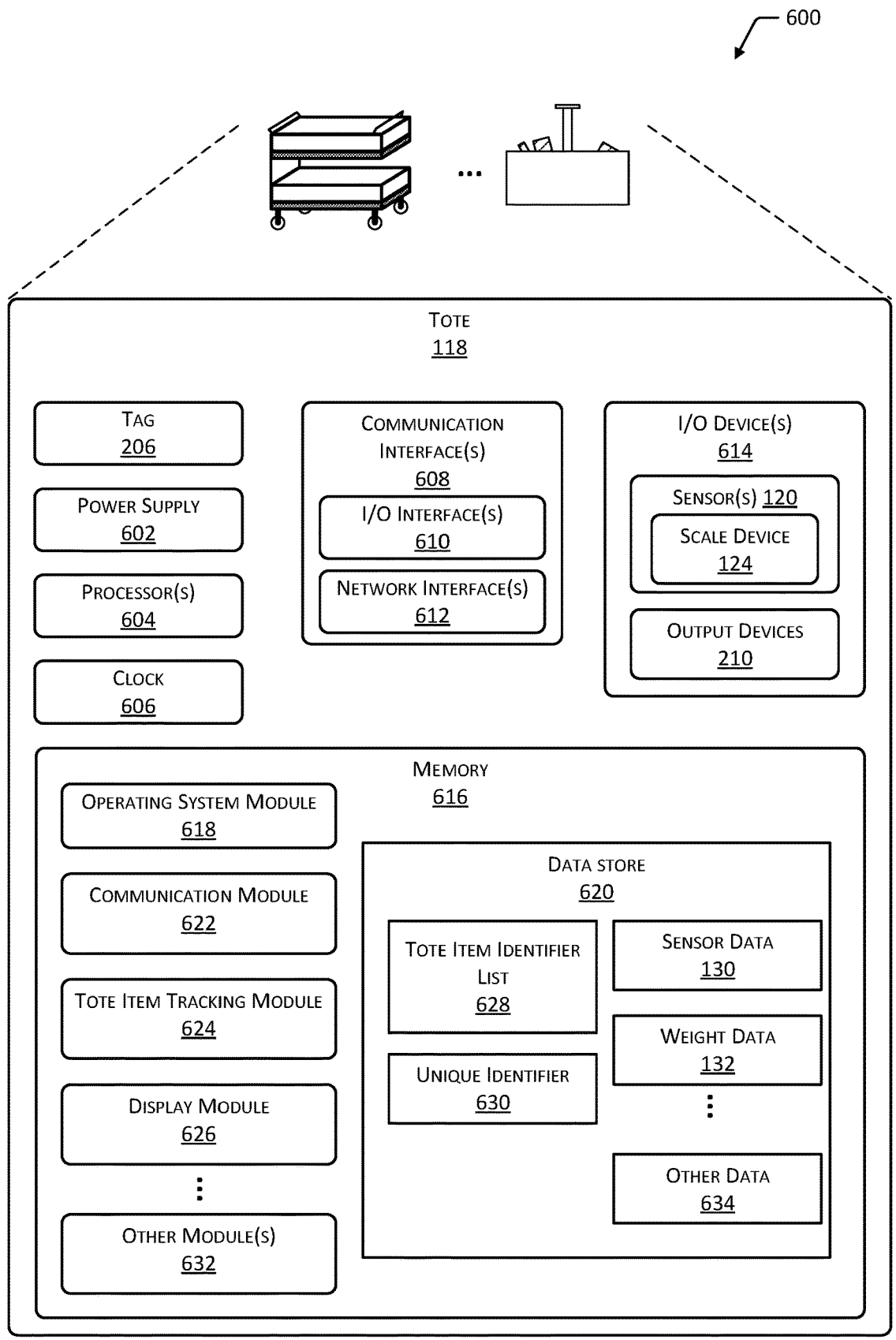
FIG. 6 illustrates a block diagram of a tote that may include a weight sensor, according to some implementations.

FIG. 6 illustrates a block diagram 600 of the tote 118, according to some implementations. The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may also include a power supply 602. The power supply 602 may be configured to provide electrical power suitable for operating the components in the tote 118. The power supply 602 may comprise one or more of photovoltaic cells, batteries, wireless power receivers, fuel cells, flywheels, capacitors, and so forth.

The tote 118 may include one or more hardware processors 604 (processors) configured to execute one or more stored instructions. The processors 604 may comprise one or more cores of different types. For example, the processors 604 may include application processor units, graphic processing units, and so forth.

One or more clocks 606 may provide information indicative of date, time, ticks, and so forth. For example, the processor 604 may use data from the clock 606 to generate time values, trigger a preprogrammed action, and so forth.

The tote 118 may include one or more communication interfaces 608, such as input/output (I/O) interfaces 610, network interfaces 612, and so forth. The communication interfaces 608 may enable the tote 118, or components thereof, to communicate with other devices or components. The communication interfaces 608 may include one or more I/O interfaces 610. The I/O interfaces 610 may comprise 12C, SPI, USB, RS-232, and so forth.

The I/O interface(s) 610 may couple to one or more I/O devices 614. The I/O devices 614 may include one or more of the input devices such as the sensors 120. As described above, the sensors 120 may include imaging sensors 120(1), weight sensors 120(6), RFID readers 120(8), and so forth. In one implementation, the I/O devices 614 may include one or more scale devices 124. The I/O devices 614 may also include output devices 210 such as haptic output devices 210(1), audio output devices 210(2), display output devices 210(3), and so forth. For example, the tote 118 may include other output devices 210(T) such as lights that may be activated to provide information to the user 116. In some implementations, I/O devices 614 may be combined. For example, a touchscreen display may incorporate a touch sensor 120(4) and a display output device 210(3). In some embodiments, the I/O devices 614 may be physically incorporated with the tote 118 or may be externally placed.

The network interfaces 612 are configured to provide communications between the tote 118 and other devices, the scale devices 124, routers, servers 204, access points 212, and so forth. The network interfaces 612 may include devices configured to couple to PANs, LANs, WANs, and so forth. For example, the network interfaces 612 may include devices compatible with Ethernet, Wi-Fi, Bluetooth, Zig-Bee, and so forth.

The tote 118 may also include one or more busses or other internal communications hardware or software that allow for the transfer of data between the various modules and components of the tote 118.

As shown in FIG. 6, the tote 118 includes one or more memories 616. The memory 616 may comprise one or more non-transitory CRSM as described above. The memory 616 provides storage of computer-readable instructions, data structures, program modules, and other data for the operation of the tote 118. A few example functional modules are shown stored in the memory 616, although the same functionality may alternatively be implemented in hardware, firmware, or as a system on a chip (SoC).

The memory 616 may include at least one OS module 618. The OS module 618 is configured to manage hardware resource devices such as the communication interfaces 608, the I/O devices 614, and so forth, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including other totes 118, scale devices 124, network attached storage devices, and so forth.

A communication module 622 may be configured to establish communications with one or more of another tote 118, the scale devices 124, servers 204, or other devices. The communications may be authenticated, encrypted, and so forth.

The memory 616 may also store a tote item tracking module 624. The tote item tracking module 624 may be configured to maintain a list of items 104, which are associated with the tote 118. For example, the tote item tracking module 624 may receive input from a user 116 by way of a touch screen display with which the user 116 may enter information indicative of the item 104 placed in the tote 118. In another example, the tote item tracking module 624 may receive input from the I/O devices 614, such as the weight sensor 120(6) or an RFID reader 120(8). The tote item tracking module 624 may send the list of items 104 to the inventory management system 122. The tote item tracking module 624 may also be configured to receive information from the inventory management system 122. For example, a list of items 104 to be picked may be presented within a user interface on the display output device 210(3) of the tote 118.

The memory 616 may include a display module 626. The display module 626 may be configured to present information, such as information received from the one or more servers 204 or generated onboard the tote 118, using one or more of the output devices 210. For example, the display module 626 may be configured to receive user interface data provided by a user interface module of the inventory management system 122. By processing user interface data, the user interface may be presented to the user 116 by way of the output devices 210 of the tote 118. For example, the user interface may include haptic output from the haptic output device 210(1), audio output from the audio output devices 210(2), images presented on the display output devices 210(3), activation of lights or other output from the other output devices 210(T), or a combination thereof.

The memory 616 may also include a data store 620 to store information. The data store 620 may use a flat file, database, linked list, tree, executable code, script, or other data structure to store the information. In some implementations, the data store 620 or a portion of the data store 620 may be distributed across one or more other devices including the servers 204, other totes 118, network attached storage devices, and so forth.

The data store 620 may store a tote item identifier list 628. The tote item identifier list 628 may comprise data indicating one or more items 104 associated with the tote 118. For example, the tote item identifier list 628 may indicate the items 104 that are present in the tote 118. The tote item tracking module 624 may generate or otherwise maintain a tote item identifier list 628.

A unique identifier 630 may also be stored in the memory 616. In some implementations, the unique identifier 630 may be stored in rewritable memory, write-once-read-only memory, and so forth. For example, the unique identifier 630 may be burned into a one-time programmable non-volatile memory, such as a programmable read-only memory (PROM). In some implementations, the unique identifier 630 may be part of a communication interface 608. For example, the unique identifier 630 may comprise a media access control (MAC) address associated with a Bluetooth interface. In some implementations, the user interface module may use the unique identifier 630 to determine upon which tote 118 to generate the user interface. In other implementations, the user interface module may use the unique identifier 630 to determine a source for the sensor data 130.

The data store 620 may also store sensor data 130. The sensor data 130 may be acquired from the sensors 120 onboard the tote 118. Weight data 132 generated by the scale device 124 may also be stored in the data store 620.

In one implementation, the I/O devices 614 may comprise one or more weight sensors 120(6) and the memory 616 may store the weight processing module 426. In this implementation, the tote 118 may operate at least in part as a scale device 124 and may provide weight data 132 to another device such as the server 204.

Other modules 632 may also be stored within the memory 616. For example, a user authentication module may be configured to receive input and authenticate or identify a particular user 116. Other data 634 may also be stored within the data store 620. For example, the other data 634 may include tote configuration settings, user interface preferences, and so forth.

Illustrative Processes

FIG. 7 depicts a process 700 of generating weight data 132, according to some implementations. In some implementations, the process may be performed at least in part by the weight processing module 426.

At 702, a first set of sensor data 130 is accessed. For example, the first set of sensor data 130 may comprise a series or sequence of measurements acquired from a weight sensor 120(6) during a time interval specified by the window length 432. In some implementations, the first set of sensor data 130 may be processed by the filter module 426(1) to produce filtered sensor data 430 that may be used subsequently.

At 704, slope value data 434 is determined for a curve, such as a line, that is fit to the first set of sensor data 130. For example, the slope module 426(2) may use a linear regression function to fit a straight line to the first set of sensor data 130. The slope value data 434 indicative of the slope of the line may be generated. The slope value data 434 is indicative of a rate of change of the sensor data 130 within the window length 432.

At 706, alarm data is generated using the slope value data 434. For example, the alarm module 426(3) may implement the CUSUM function as described above with regard to FIG. 4. The alarm module 426(3) provides as output, alarm data 708. The alarm data 708, as described above, provides information indicative of when the sensor data 130 has met or exceeded the conditions sufficient to generate an alarm. For example, where the slope value data 434 exceeds a threshold value.

At 710, change data 438 is generated using the alarm data 708. For example, the change detector module 426(4) may process the alarm data 708 to determine when the sensor data 130 is in a stable state or an unstable state. For example, the alarm data 708 may indicate the CUSUM function has determined that the slope value data 434 is outside of a threshold value at a particular time value. Based on the slope value data 434 being outside this threshold, the change detector module 426(4) may determine that the state of the sensor data 130 is unstable at that time value. In another example, should the CUSUM function determine the slope value data 434 is within the threshold at the particular time value, the change detector module 426(4) may determine that the state of the sensor data 130 is stable at that time value.

At 712, the weight calculation module 426(5) determines a transition from a first stable state to an unstable state and then to a second stable state. For example, the user 116 may remove an item 104 from the inventory location 114 having a scale device 124. The first stable state corresponds to a first time before the user 116 removed the item 104, the unstable state corresponds to a second time during the removal and shortly thereafter, and the second stable state corresponds to a third time at which the weight sensor 120(6) has settled. The weight calculation module 426(5) may interpret the sequence of states as being indicative of an object being added to, or removed from, the weight sensor 120(6) of the scale device 124.

At 714, the weight calculation module 426(5) generates weight data 132 using the sensor data 130 associated with one or more of the first time or the third time. For example, a time value for a particular state may be associated with corresponding sensor data 130 acquired at the same time value. Continuing the example, the change data 438 may indicate that the second stable state occurred at t=45. The sensor data 130 corresponding to t=45 had a value of 153. As a result, the weight of the second stable state is 153.

In other implementations a time series may be selected that includes the sensor data 130 extending from a time from the first time through the third time, including sensor data 130 corresponding to the unstable state, or any portion thereof. The time series may then be processed to determine a value. For example, an average of the values in the time series may be calculated and used to generate the weight data 132.

As described above, in some implementations the process 700 may use filtered sensor data 430. For example, the weight calculation module 426(5) may use as the weight data 132 the filtered sensor data 430 associated with the time value. The time value may be indicative of a time of a most recent sample or measurement of sensor data 130 that is included in the window length 432.

Figure 8:
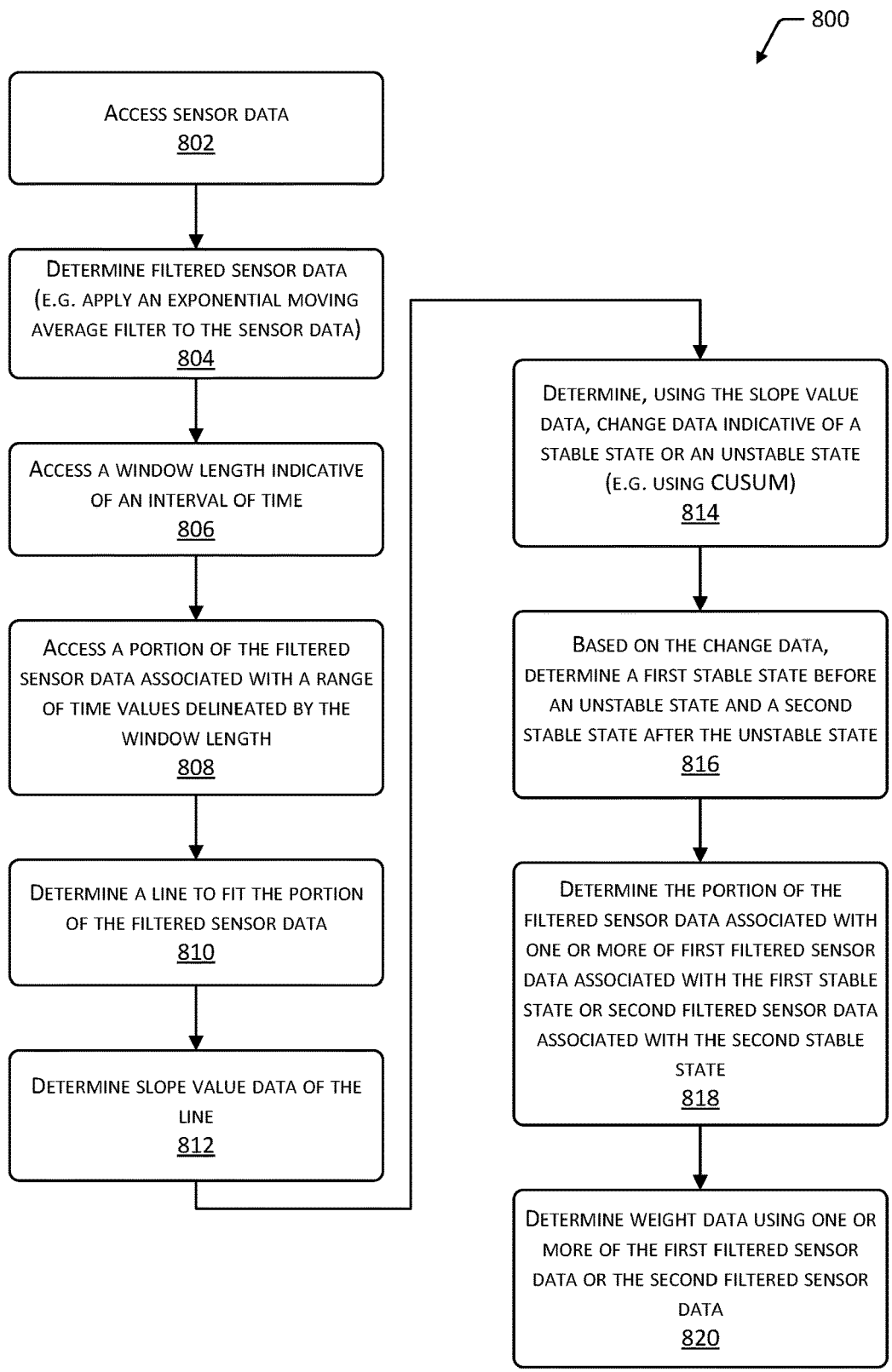
FIG. 8 depicts a flow diagram of a process of generating weight data using a slope value, according to some implementations.

FIG. 8 depicts a flow diagram 800 of a process of generating weight data 132 using a slope value, according to some implementations. In some implementations, the process may be performed at least in part by the weight processing module 426.

Block 802 accesses sensor data 130.

Block 804 determines filtered sensor data 430 from the sensor data 130. For example, the filter module 426(1) may process the sensor data 130 using an exponential moving average function as described in Code Implementation 1.

Block 806 accesses a window length 432 indicative of an interval of time. For example, the window length 432 may be specified by the configuration data 128 received from the scale management module 528. In some implementations, the window length 432 may be between at least 400 milliseconds and at most 600 milliseconds. For example, the window length 432 may be about 500 ms. In implementations where the sensor data 130, the filtered sensor data 430, or both are expressed in terms of individual samples, frames, or other discrete data elements, window length 432 may be specified in terms of a number of those discrete data elements. For example, window length 432 may be specified as 15 samples.

Block 808 accesses a portion of the filtered sensor data 430 associated with a range of time values delineated by the window length 432. Continuing the example above, the 15 most recent samples may be accessed.

Block 810 determines a line based on the filtered sensor data 430 occurring within the window length 432. For example, the slope module 426(2) may fit a line to the filtered sensor data 430 using a linear regression function. Continuing the example, the linear regression function may comprise a least square regression function described above with regard to Code Implementation 2.

Block 812 determines slope value data 434 of the line. Continuing the example, the slope module 426(2) may calculate the slope of the line and provide that output as the slope value data 434. As described above, the slope value data 434 may be visualized as being indicative of a change in rise over a run of the line or how "steep" the line is.

Block 814 determines change data 438 associated with the slope value data 434. For example, the alarm module 426(3) may generate alarm data 708 which is then processed by the change detector module 426(4) to generate the change data 438. In some implementations, the alarm module 426(3) may implement a cumulative sum (CUSUM) function, such as described above with regard to Code Implementation 3.

As described above, the change data 438 is indicative of one of stability or instability of the filtered sensor data 430 within the interval of time specified by the window length 432. The filtered sensor data 430 may be deemed to be stable when values of the filtered sensor data 430 are unchanging or less than a threshold value during the interval of time. For example, where the values of the filtered sensor data 430 are within 5% of a median value, they may be designated as stable. The filtered sensor data 430 may be deemed to be unstable when variance of the values exceeds the threshold value during the interval of time. For example, where a second value at an end of the interval of time varies by more than 5% from a first value at a beginning of the interval of time, the filtered sensor data 430 may be unstable. During periods of instability, the values in the filtered sensor data 430 may be unreliable. For example, the unstable values may be the result of mechanical motion while a platform of the scale device 124 oscillates during settling. Use of the filtered sensor data 430 acquired during an unstable time may result in incorrect weight data 132. Stated another way, the stable state may correspond to stable output by the sensor (such as while settled), while the unstable state may correspond to unstable output by the sensor (such as during or immediately after a perturbation). By using the filtered sensor data 430 acquired during a stable interval of time, the accuracy of the weight data 132 is improved. By utilizing the change data 438, the weight processing module 426 may be able to more quickly generate weight data 132 without having to wait for a lengthy settling time.

Based on the change data 438, a first stable state occurring before an unstable state is determined. Also determined based on the change data 438 is a second stable state after the unstable state.

Block 816, based on the change data 438, determines a first stable state before an unstable state and a second stable state after the unstable state.

Block 818 determines the portion of the filtered sensor data 430 associated with one or more of a first filtered sensor data 430(1) associated with the first stable state or second filtered sensor data 430(2) associated with the second stable state. For example, the change data 438 may be associated with the filtered sensor data 430 using a time value. In some implementations, the association may be made using the last time value appearing within the range of time values corresponding to the respective state. For example, the time value of the last sample in the window length may be used.

Block 820 determines weight data 132. For example, the weight data 132 may comprise a weight difference indicative of a change in the weight from the first filtered sensor data 430(1) to the second filtered sensor data 430(2). In another example, the weight data 132 may comprise the second filtered sensor data 430(2) indicating the weight after return to a stable state.

The sensor data 130 may be generated by a weight sensor 120(6) at an inventory location 114. The inventory data 530 associated with the inventory location 114 may be accessed to obtain a weight of a predetermined quantity of items 104 stowed at the inventory location 114. For example, the inventory data 530 may indicate the weight of a single item 104. The weight calculation module 426(5) may divide the weight difference by the weight of a single item 104, to determine a count indicative of a change in the quantity of items 104 stowed at the inventory location 114.

The process 800 in some implementations may be iterated. For example, as additional samples of sensor data 130 are generated and accessed, they may be included in the interval of time specified by the window length 432, while oldest samples may be dropped. Continuing the example, the window of time specified by the window length 432 may "move forward" such that new samples of sensor data 130 are added and oldest entry samples are discarded from the window of time.

While the process 800 describes the use of the filtered sensor data 430 to determine the slope value data 434, for association to generate the weight data 132, and so forth, in some implementations the sensor data 130 may be used.

Figure 9:
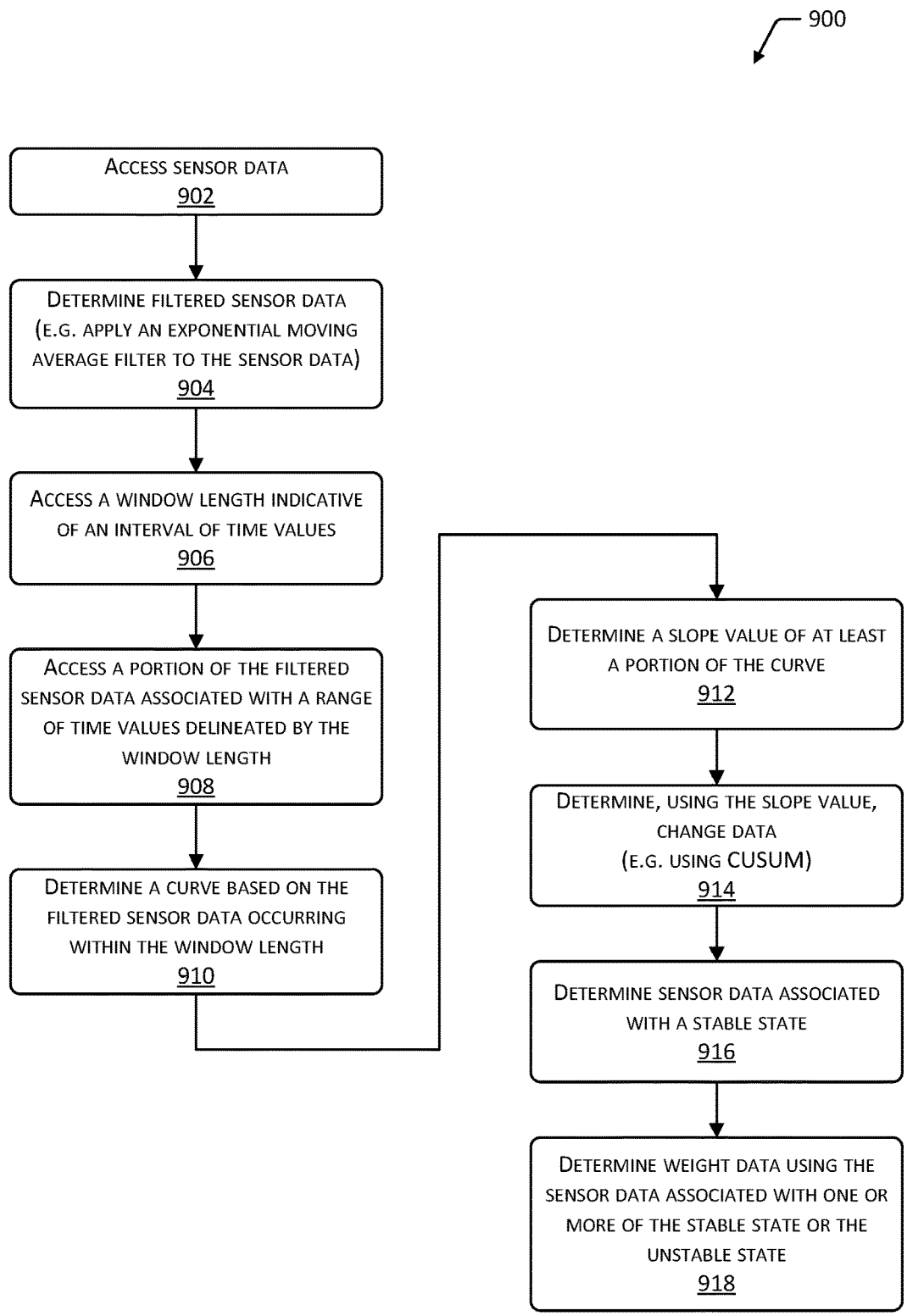
FIG. 9 depicts a flow diagram of another process of generating weight data using a slope value, according to some implementations.

FIG. 9 depicts a flow diagram 900 of another process of generating weight data using a slope value, according to some implementations. In some implementations, the process may be performed at least in part by the weight processing module 426.

Block 902 accesses sensor data 130. For example, sensor data 130 may comprise information from the weight sensor 120(6).

Block 904 determines filtered sensor data 430 from at least a portion of the sensor data 130. For example, the filter module 426(1) may apply the exponential moving average (EMA) function described above with regard to Code Implementation 1.

Block 906 accesses a window length 432. As described above, the window length 432 may be indicative of an interval of time values, number of samples, number of frames, and so forth. For example, the window length 432 may specify 15 samples of sensor data 130.

Block 908 accesses a portion of the filtered sensor data 430 that is associated with times within the window length 432. For example, Block 908 may access the most recent 15 samples of sensor data 130.

Block 910 determines a curve based on the portion of the filtered sensor data 430 occurring within the window length 432. In some implementations, the curve may comprise a line having a null curvature. For example, the slope module 426(2) may fit a straight line to the portion of the sensor data 130 occurring within a time window specified by the window length 432. Where the curve is a straight line, a linear regression function may be used. As described above, the slope module 426(2) may implement a least square function.

Block 912 determines slope value data 434 of at least a portion of the curve. For example, where the curve is a straight line the slope value data 434 may be determined for any point on the line. In other implementations, such as where the curve has a positive or negative curvature, the slope value data 434 may be determined for a particular portion of the curve. For example, the slope value data 434 may be determined for the slope of a tangent at a midpoint of the curve. In another implementation, the slope value data 434 may comprise a first derivative of the curve.

Block 914 determines, using the slope value data 434, the change data 438. For example, the alarm module 426(3) may use the cumulative sum (CUSUM) function to generate alarm data 708 indicative of when the filtered sensor data 430 has exceeded a threshold value. One implementation of the generation of the alarm data 708 is described above with regard to the Code Implementation 3. The change detector module 426(4) may process the alarm data 708 to generate the change data 438. One implementation of the generation of the change data 438 is described above with regard to the Code Implementation 4. The change data 438 is indicative of one of stability or instability of the filtered sensor data 430 (or the sensor data 130) within the window of time specified by the window length 432.

Block 916 determines, using the change data 438, the filtered sensor data 430 associated with one or more of a stable state or an unstable state. For example, the change data 438 may indicate a period of time during which the slope value data 434 is less than or equal to a threshold value and thus does not generate an alarm is deemed to be stable. In comparison, change data 438 indicative of a time during which the slope value data 434 exceeds the threshold value generates an alarm and is deemed to be unstable.

In one implementation, an association between the one or more of the stable state or the unstable state and the filtered sensor data 430 may be based on one or more time values. For example, the time value associated with a stable state may be used to retrieve corresponding filtered sensor data 430 having the same time value or a time value within a threshold value.

Block 918 determines weight data 132 using the filtered sensor data 430 associated with one or more of the stable state or the unstable state. Continuing the example, the filtered sensor data 430 corresponding to the change data 438 indicative of a stable state may be designated as indicative of the weight measured by the scale device 124 at that time.

In some implementations, particular transitions may be of interest. In one situation, the addition or removal of items 104 from a scale device 124 associated with an inventory location 114 may exhibit the particular pattern of a stable state, unstable state, then stable state. The weight calculation module 426(5) may be configured to recognize this pattern and produce weight data 132. For example, a first block may determine first filtered sensor data 430(1) associated with a first stable state occurring at a time before an unstable state. A second block may determine second filtered sensor data 430(2) associated with a second stable state occurring at a time after the unstable state. A third block may determine a difference between the first filtered sensor data 430(1) and the second filtered sensor data 430(2).

In another situation, the transition between a stable state and an unstable state may be of interest. For example, a first block may determine first filtered sensor data 430(1) associated with a stable state occurring at one of before or after an unstable state. A second block may designate the first filtered sensor data 430(1) as weight data 132.

While the process 900 describes the use of the filtered sensor data 430 to determine the slope value data 434, for association to generate the weight data 132, and so forth, in some implementations the sensor data 130 may be used.

The techniques described herein may be used in a variety of different situations. Data acquired by a sensor 120 on a handheld device, onboard an autonomous vehicle, and so forth may be processed as described above. For example, readings from a magnetometer onboard an autonomous vehicle may be processed using these techniques to provide data indicative of a magnetic compass heading.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a shelf;
    a weight sensor to acquire weight data of one or more items on the shelf over a period of time;
    a memory, storing computer-executable instructions; and
    a hardware processor in communication with the weight sensor and the memory, wherein the hardware processor is configured to execute the computer-executable instructions to:
        detect a change in weight at the shelf over the period of time;
        responsive to the detection of the change in the weight at the shelf, access the weight data;
        fit a line to a portion of the weight data;
        determine a slope value of the line;
        determine change data associated with the slope value of the line, wherein the change data is indicative of the portion of the weight data being in one or more of a stable state or an unstable state;
        determine a first stable state of the weight data;
        determine a first unstable state of the weight data after the first stable state;
        determine a second stable state of the weight data after the first unstable state;
        determine, as first weight data, weight data occurring at a first time during the first stable state;
        determine, as second weight data, weight data occurring at a second time during the second stable state;
        determine weight change data at the shelf by determining a difference between the first weight data and the second weight data; and
        determine, using the weight change data at the shelf, a change in quantity of the one or more items on the shelf.

2. The system of claim 1, wherein the hardware processor is further configured to execute the computer-executable instructions to:
    determine filtered weight data from the weight data using an exponential moving average function.

3. The system of claim 1, wherein the hardware processor is further configured to execute the computer-executable instructions to:
    access a window length indicative of an interval of time; and
    access the portion of the weight data having associated time values within a range of time values delineated by the window length.

4. The system of claim 1, the hardware processor further configured to execute the computer-executable instructions to:
    determine a threshold value; and
    wherein the portion of the weight data is determined to be in a stable state when the slope value is less than or equal to the threshold value or in an unstable state when the slope value is greater than the threshold value.

5. The system of claim 1, wherein:
    the line is determined using a linear regression; and
    the change data is determined using the slope value of the line and a cumulative sum (CUSUM) function.

6. A system comprising:
    an inventory location;
    a weight sensor to acquire weight data of one or more items at the inventory location;
    a memory, storing computer-executable instructions; and
    a hardware processor in communication with the weight sensor and the memory, wherein the hardware processor is configured to execute the computer-executable instructions to:
        access the weight data;
        determine filtered weight data from the weight data;
        determine a curve fitted to a portion of the filtered weight data;
        determine change data with respect to the filtered weight data, based on one or more characteristics of the curve;
        determine a first stable state of the filtered weight data;
        determine a first portion of the filtered weight data corresponding to the first stable state;
        determine a second stable state of the filtered weight data occurring after the first stable state;
        determine a second portion of the filtered weight data corresponding to the second stable state;
        determine weight change data at the inventory location by determining a difference between the first portion of the filtered weight data and the second portion of the filtered weight data; and
        determine a change in quantity of the one or more items stowed at the inventory location based on the weight change data.

7. The system of claim 6, wherein the filtered weight data is determined using an exponential moving average function.

8. The system of claim 6, wherein:
    the curve is a line; and
    the line is determined using a linear regression function.

9. The system of claim 6, the hardware processor to further execute the computer-executable instructions to:
    determine a threshold amount;
    determine an unstable state occurring after the first stable state and before the second stable state;
    wherein the first stable state and the second stable state represent a state where weight data is unchanged or changed by less than the threshold amount; and
    wherein the unstable state represents a state where weight data changes by more than the threshold amount.

10. The system of claim 6, wherein:
    the curve comprises a line;
    the one or more characteristics of the line comprise a slope value of the line; and
    the change data is determined using the slope value of the line and a cumulative sum (CUSUM) function.

11. The system of claim 6, wherein the change data is indicative of a stable state when a slope value of the curve is less than or equal to a threshold value and indicative of an unstable state when the slope value is greater than the threshold value.

12. The system of claim 6, wherein the hardware processor is further configured to execute the computer-executable instructions to:
    access a window length indicative of an interval of time; and
    access the portion of the filtered weight data having associated time values within a range of time values delineated by the window length.

13. The system of claim 6, the hardware processor to further execute the computer-executable instructions to:
   access individual weight data of the one or more items;
   divide the weight change data at the inventory location by the individual weight data of the one or more items to determine the change in quantity of the one or more items at the inventory location;
   access an inventory quantity of the one or more items at the inventory location; and
   determine a remaining quantity of the one or more items at the inventory location by subtracting the change in quantity of the one or more items from the inventory quantity of the one or more items.

14. A system comprising:
   a sensor to acquire sensor data associated with one or more items at an inventory location;
   a memory, storing computer-executable instructions; and
   a hardware processor in communication with the sensor and the memory, wherein the hardware processor is configured to execute the computer-executable instructions to:
      access the sensor data;
      determine filtered sensor data from the sensor data;
      determine change data with respect to the filtered sensor data based on one or more characteristics of a portion of the filtered sensor data;
      determine a first portion of the filtered sensor data is in a first stable state;
      determine a second portion of the filtered sensor data is in an unstable state after the first stable state;
      determine a third portion of the filtered sensor data is in a second stable state after the unstable state;
      determine weight change data for the inventory location by determining a difference between the first portion of the filtered sensor data and the third portion of the filtered sensor data; and
      determine, using the weight change data for the inventory location, a change in quantity of the one or more items at the inventory location.

15. The system of claim 14, wherein:
   the filtered sensor data is determined by applying an exponential moving average filter to the sensor data.

16. The system of claim 14, wherein the hardware processor is further configured to execute the computer-executable instructions to:
   fit a curve to the portion of the filtered sensor data;
   determine a slope value of the curve;
   generate alarm data using the slope value; and
   wherein the change data is determined using the alarm data.

17. The system of claim 16, wherein:
   the curve is a line; and
   the line is determined using a linear regression that uses a least squares error function.

18. The system of claim 14, the hardware processor further configured to execute the computer-executable instructions to:
   determine a transition in the filtered sensor data from the first stable state at a first time to the unstable state at a second time; and
   determine a second transition in the filtered sensor data from the unstable state at the second time to the second stable state at a third time.

19. The system of claim 14, the hardware processor further configured to execute the computer-executable instructions to:
   access the portion of the filtered sensor data associated with a range of time values delineated by a window length; and
   wherein the window length is at least 400 milliseconds and at most 600 milliseconds.

20. The system of claim 14, the hardware processor to further execute the computer-executable instructions to:
   determine a curve fitted to the portion of the filtered sensor data;
   wherein the one or more characteristics of the portion of the filtered sensor data comprise a slope value of the curve;
   wherein the change data is indicative of a stable state when the slope value of the curve is less than or equal to a threshold value; and
   wherein the change data is indicative of an unstable state when the slope value of the curve is greater than the threshold value.

* * * * *